UNITED STATES PATENT OFFICE.

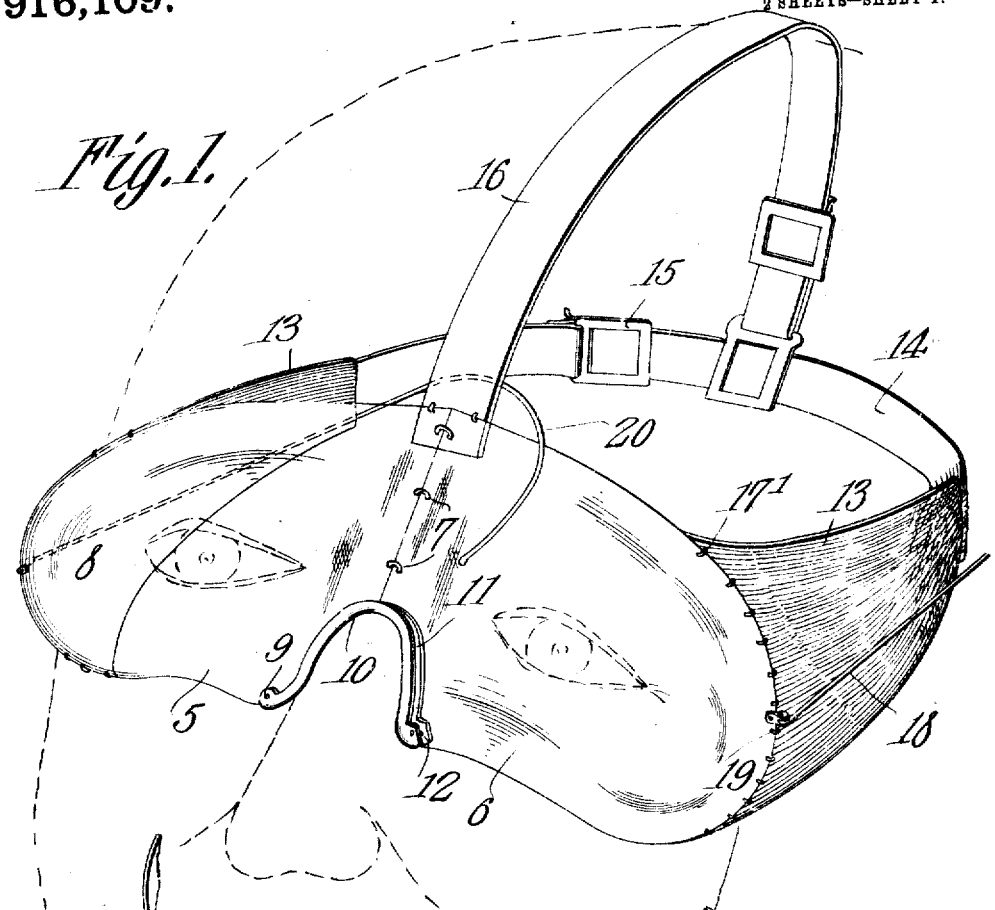
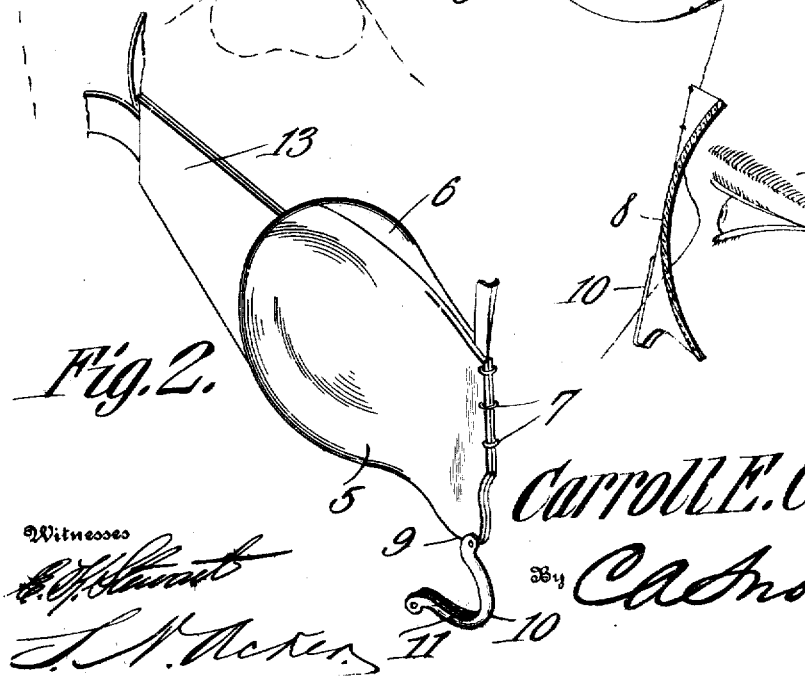

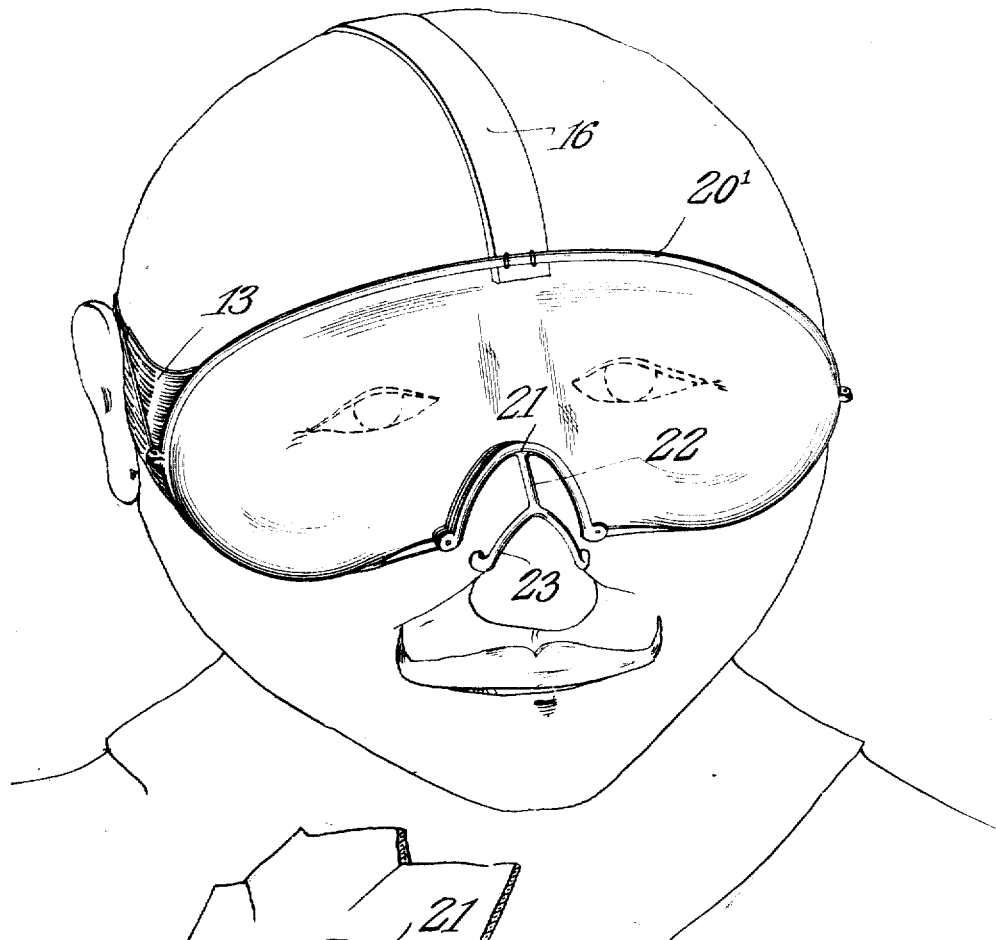
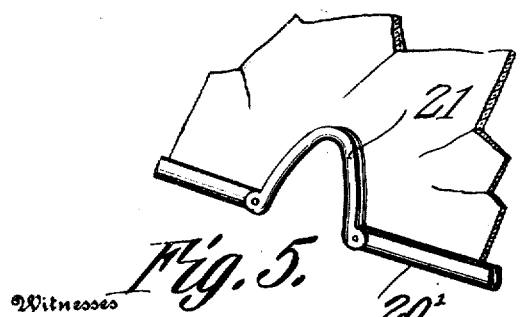

CARROLL EUGENE COOK, OF NEW LONDON, IOWA.

SHOOTING-GLASSES.

No. 916,109.  Specification of Letters Patent.  Patented March 23, 1909.

Application filed October 30, 1908. Serial No. 460,349.

*To all whom it may concern:*

Be it known that I, CARROLL EUGENE COOK, a citizen of the United States, residing at New London, in the county of Henry and State of Iowa, have invented new and useful Shooting-Glasses, of which the following is a specification.

This invention relates to goggles and has for its object to provide an eye shield or covering especially designed for use by marksmen, gunners and other persons for protecting the eyes from gun-powder, gas dirt and flying particles when firing heavy guns or light ordnance.

A further object of the invention is to provide an eye covering including pivotally united sections each having a convex portion to prevent the accumulation of moisture on the glass and capable of being folded laterally to closed position so that the goggles may be conveniently carried in the pocket.

A further object is to provide a protector which will act as a shield to protect the eyes from the glare of the sun and which will also soften the light and otherwise protect the eyes.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a perspective view of an eye-protector constructed in accordance with my invention, showing the application of the same. Fig. 2 is a perspective view of the eye covering or goggles detached and the sections thereof in folded position. Fig. 3 is a vertical sectional view through one of the pivoted sections of the goggles. Fig. 4 is a perspective view illustrating a modified form of eye protector. Fig. 5 is a detail perspective view showing a different style of nose piece for use in connection with the eye protector shown in Fig. 4 of the drawings.

Similar numerals of reference indicate corresponding parts in all of the figures of the drawings.

The improved eye covering forming the subject matter of the present invention includes mating sections 5 and 6 preferably formed of glass, mica, celluloid or other transparent material, said sections being pivotally united at 7 so that the same may be folded one upon the other and conveniently carried in the pocket of the wearer.

The sections 5 and 6 may be formed of amber, blue or smoked glass to protect the eyes from the glare of the sun, each section having its central portion convex at 8 and its outer edge curved to conform to the shape of the face so as to make a tight fitting glass.

The pivoted end of each lens or section is cut away to accommodate the nose, and pivotally mounted at 9 on the section 5 is one end of a nose piece 10, the opposite end of which is arranged to detachably engage the section 6, said nose piece being provided with an annular groove 11 adapted to receive the adjacent edges of the sections 5 and 6 at the cut away portions thereof so as to lock said sections in extended or operative position.

A pin 12 is preferably formed on one end of the nose piece 10 and adapted to enter a correspondingly shaped opening formed in the section 6, but if desired a clamping screw, clip or other suitable fastening device may be substituted for the pin.

Extending rearwardly from the outer ends of the sections 5 and 6 are side shields 13 preferably formed of green silk and having elastic strips 14 secured to the ends thereof and fastened together at the back of the head of the wearer by a buckle 15, there being a similar elastic strip 16 secured to the goggles at the juncture of the sections 5 and 6 and arranged to pass over the top of the head of the wearer for attachment to the adjacent elastic strip 14, thereby to retain the goggles in position on the face of the wearer.

The side shields 13 are preferably secured to the end of the adjacent sections 5 and 6 by loops or eyes 19, the latter being preferably formed of cord or twine and extended through spaced apertures formed in the adjacent edges of the sections 5 and 6 for engagement with the side shields, as shown.

In order to assist in preventing accidental displacement of the goggles, the latter are provided with side guards 18 each having one end thereof pivotally connected at 19 with the adjacent lens or sections and its opposite end provided with a terminal hook 20 adapted to fit over the ear of the wearer.

By providing each lens or section with a concaved portion 8 moisture is effectually prevented from accumulating on said sections and thus dimming or obscuring the vision of the wearer, while the side shields 13 not only serve to protect the eyes from side rays of light, but also serve to prevent the entrance of foreign particles at the rear of the goggles.

If desired the sections 5 and 6 may be reinforced and strengthened by the provision of a marginal rim, which latter may be formed of gold, silver, aluminum or other similar material.

Thus it will be seen that when the goggles are in position the eyes are effectually protected from the glare of the sun and from flying particles of dust and other foreign matter. It will also be observed that when the fastening device 12 is released the sections 5 and 6 may be folded laterally one upon the other so as to occupy very little space and thus permit the goggles to be conveniently carried in the pocket.

In Fig. 4 of the drawings there is illustrated a modified form of the invention in which the body portion of the protector is substantially elliptical in shape and constructed from a single piece of glass or other transparent material, the marginal edge of the body portion being reinforced and strengthened by a rim 20'. The lower edge of the body portion is cut away to accommodate the nose of the wearer and is provided with a nose piece 21, which latter forms a continuation of the marginal rim 20'. Extending from the central portion of the nose piece 21 is an arm 22 carrying an auxiliary nose piece 23, which latter serves to assist in preventing accidental displacement of the protector. If desired, however, the auxiliary nose piece 23 and connecting arm 22 may be dispensed with as illustrated in Fig. 5 of the drawings.

While the goggles are principally designed for use by marksmen, gunners and similar persons it is obvious that the same may be used with equally good results by motorists, cyclists or persons having weak or affected eyes.

When the eye protector is used for the latter purpose the sections or lenses 5 and 6 will be so constructed as to correct the defect in the eye sight, that is to say the sections may be concaved or convexed or said sections formed of pebble glass or the like so as to correct the particular defect in the eyes of the wearer.

Having thus described the invention what is claimed is:—

1. An eye protector including pivotally united transparent sections movable laterally to folded position, and a nose piece pivotally connected with one of said sections and detachably engaging the mating section for supporting said sections in extended position.

2. An eye protector including pivotally united transparent sections movable laterally to folded position and each provided with a concavo-convex portion, and a nose piece pivotally connected with one of said sections and detachably engaging the mating section for supporting said sections in extended position.

3. An eye protector including pivotally united transparent sections movable laterally to folded position and each provided with a cut away portion, and a nose piece pivotally mounted on one of said sections and adapted to detachably engage the adjacent section for supporting said sections in extended position, the nose piece being provided with a groove for the reception of the adjacent edge of the sections at the cut away portion thereof.

4. An eye protector including pivotally united sections movable laterally to folded position and each provided with a concavo-convex portion, a nose piece connecting said sections and serving to hold the latter in extended position, side shields secured to the outer ends of the pivoted sections and provided with means for engagement with each other, and a head strap having one end thereof secured to the protector and its opposite end connected with the side shields.

5. An eye protector including pivotally united sections movable laterally to folded position and each provided with a concavo-convex portion, a nose piece pivotally mounted on one of the sections and arranged to detachably engage the adjacent section for supporting both of said sections in extended position, side shields secured to the free ends of the sections, elastic straps carried by the side shields and provided with means for engagement with each other, and a head strap having one end thereof secured to said sections at the pivotal juncture of the latter and its opposite end provided with means for engagement with the elastic straps of the side shields.

6. An eye protector including pivotally united sections curved to conform to the shape of the face of the wearer and each provided with a concavo-convex portion, a nose piece pivotally mounted on one of said sections and adapted to detachably engage the other section for supporting said sections rigidly in extended position, side shields secured to the outer ends of said sections, and means for securing the protector in position on the head of the wearer.

7. An eye protector including pivotally united transparent sections curved to conform to the shape of the wearer and each provided with a concavo-convex portion, a nose piece forming a connection between said sections and serving to support the same in extended position, side shields secured to the free ends of said sections, a head strap, and side guards pivotally connected with said sections at the side shields and provided with ear engaging hooks.

8. An eye protector including pivotally united sections formed of colored glass and each provided with a concavo-convex portion and having a marginal flange curved to conform to the shape of the face of the wearer, said sections having their pivoted ends cut away to accommodate the nose, a nose piece having one end thereof pivotally connected to one of the sections and its opposite end provided with means for detachable engagement with the adjacent section, said nose piece being provided with a groove adapted to receive the adjacent edges of both sections at the cut away portions thereof, side shields secured to the free ends of the pivoted sections, an elastic strap connecting the side shields, a head strap having one end thereof secured to the pivoted sections at a point above and in alinement with the nose piece and its opposite end connected with the elastic strap, and side guards pivoted to said sections and provided with terminal ear engaging hooks.

9. An eye protector including a transparent longitudinally and transversely concavo-convex body portion having a recess formed in its lower edge, a nose piece seated in said recess, shields secured to the opposite ends of the body and provided with attaching straps, and a head strap secured to the top of said body portion for engagement with the attaching strap.

10. An eye protector including a substantially elliptical transparent longitudinally and transversely concavo-convex body portion having its lower longitudinal edge provided with a recess, a nose piece seated in said recess, shields secured to the opposite ends of the body portion and provided with attaching straps, a head strap having one end thereof secured to the body portion and its opposite end fastened to the attaching strap, and ear guards secured to said body portion in front of the shields, said shields serving to prevent the ear guards from coming in contact with the head of the wearer.

In testimony that I claim the foregoing as my own, I have hereto affixed my signature in the presence of two witnesses.

CARROLL EUGENE COOK.

Witnesses:
  O. H. TYNER,
  JESSE WALKER.